United States Patent
Sun et al.

(10) Patent No.: US 12,056,967 B2
(45) Date of Patent: Aug. 6, 2024

(54) SYSTEM AND METHOD FOR CONTROLLING A COMPRESSION IGNITION ENGINE

(71) Applicants: Regents of the University of Minnesota, Minneapolis, MN (US); The United States of America As Represented By the Secretary of The Army, Washington, DC (US)

(72) Inventors: Zongxuan Sun, Plymouth, MN (US); Xiaonan Dong, Hermosa Beach, CA (US); Clifford Francis Webster Goertemiller, Saint Paul, MN (US); Kenneth Seong-uk Kim, Clarksville, MD (US); Chol-bum Mike Kweon, Hanover, MD (US)

(73) Assignees: Regents of the University of Minnesota, Minneapolis (MN); The United States of America As Represented By the Secretary of The Army, Washington, DC (US)

( * ) Notice: Subject to any disclaimer, the term of this patent is extended or adjusted under 35 U.S.C. 154(b) by 0 days.

(21) Appl. No.: 18/316,764

(22) Filed: May 12, 2023

(65) Prior Publication Data
US 2023/0368590 A1 Nov. 16, 2023

Related U.S. Application Data
(60) Provisional application No. 63/364,675, filed on May 13, 2022.

(51) Int. Cl.
*G07C 5/08* (2006.01)
(52) U.S. Cl.
CPC ................. *G07C 5/0808* (2013.01)

(58) Field of Classification Search
CPC ................................... G07C 5/0808
See application file for complete search history.

(56) References Cited

U.S. PATENT DOCUMENTS

| | | |
|---|---|---|
| 8,265,853 B2 | 9/2012 | Buslepp et al. |
| 8,266,947 B2 | 9/2012 | Yoeda |

(Continued)

FOREIGN PATENT DOCUMENTS

| | | | |
|---|---|---|---|
| CN | 113868956 A | * | 12/2021 |
| FR | 2862089 B1 | | 11/2007 |

(Continued)

OTHER PUBLICATIONS

Bohn et al., "State Observer Based Analysis of Crankshaft Speed Measurements with Application to Misfire Detection," 2005 International Conference on Control and Automation ICCA2005, Jun. 27-29, 2005, pp. 239-244.

(Continued)

*Primary Examiner* — Joseph J Dallo
(74) *Attorney, Agent, or Firm* — Shumaker & Sieffert, P.A.

(57) ABSTRACT

In some examples, a method for estimating the cetane number of a fuel includes receiving current engine operating condition measurements from a compression ignition (CI) engine using the fuel, and determining a value for a current engine performance indicator. The method further includes determining a projected engine performance indicator value for the CI engine based on the current estimated cetane number, current engine control signals and the current engine operating condition measurements. The method also includes determining that a difference between the value of the current engine performance indicator and the projected engine performance indicator value is greater than a threshold amount. If the difference is greater than the threshold (Continued)

amount, the method also includes determining a new estimated cetane number.

20 Claims, 7 Drawing Sheets

(56) References Cited

U.S. PATENT DOCUMENTS

| | | | |
|---|---|---|---|
| 8,281,643 | B2 | 10/2012 | Yasuda |
| 8,342,011 | B2 | 1/2013 | Galtier et al. |
| 8,396,649 | B2 | 3/2013 | Huang |
| 8,423,267 | B2 | 4/2013 | Iwatani |
| 8,429,955 | B2 | 4/2013 | Taglialatela Scafati et al. |
| 9,127,608 | B2 | 9/2015 | Ito et al. |
| 9,212,615 | B2 | 12/2015 | Shimo et al. |
| 9,423,390 | B2 | 8/2016 | Tsuchimaya et al. |
| 9,494,489 | B2 | 11/2016 | Hagari |
| 10,345,286 | B2 | 7/2019 | Cochet et al. |
| 10,519,888 | B2 | 12/2019 | Huang et al. |
| 10,683,822 | B2 | 6/2020 | Yamamoto |
| 2010/0037858 | A1* | 2/2010 | Kang ............ F02P 15/08 123/406.23 |
| 2018/0348401 | A1* | 12/2018 | Imhof ............ G06T 17/05 |
| 2019/0250520 | A1* | 8/2019 | Urbanczyk ........ G03F 7/70516 |
| 2021/0079856 | A1* | 3/2021 | Henein ............ F02M 57/005 |

FOREIGN PATENT DOCUMENTS

| | | | | |
|---|---|---|---|---|
| JP | 4788640 | B2 | 10/2011 | |
| WO | 2009065549 | A1 | 5/2009 | |
| WO | WO-2013102916 | A1 * | 7/2013 | ............ G01N 33/28 |
| WO | WO-2014123993 | A1 * | 8/2014 | ............ G05B 13/04 |
| WO | WO-2021093769 | A1 * | 5/2021 | ........ G01N 21/6404 |

OTHER PUBLICATIONS

Cai et al., "Fault Detection and Diagnostic Method of Diesel Engine by Combining Rule-Based Algorithm and BNs/BPNNs," Journal of Manufacturing Systems, vol. 57, Oct. 2020, pp. 148-157.
Dykas et al., "Acoustic Emission Characteristics of a Single Cylinder Diesel Generator at Various Loads and with a Failing Injector," Mechanical Systems and Signal Processing, vol. 93, Sep. 2017, pp. 397-414.
El-Ghamry et al., "The Development of Automated Pattern Recognition and Statistical Feature Isolation Techniques for the Diagnosis of Reciprocating Machinery Faults Using Acoustic Emission," Mechanical Systems and Signal Processing, vol. 17, No. 4, Jul. 2003, pp. 805-823.
Gao et al., "SOC Detection of Diesel Engines Based on Online Estimation of Motored Pressure," ASME 2013 Internal Combustion Engine Division Fall Technical Conference, Oct. 13-16, 2013.
Gu et al., "Non-Parametric Models in the Monitoring of Engine Performance and Condition Part 2: Non-Intrusive Estimation of Diesel Engine Cylinder Pressure and its Use in Fault Detection," Proceedings of the Institution of Mechanical Engineers, Part D, vol. 213, No. 2, Feb. 1999, pp. 135-143.
Han et al., "Virtual Engine In-Cylinder Pressure Sensor for Automobiles and Agricultural Tractors," IFAC—PapersOnLine, vol. 53, No. 1, Jan. 2020, pp. 543-548.
Jafari et al., "In-Cylinder Pressure Reconstruction by Engine Acoustic Emission," Mechanical Systems and Signal Processing, vol. 152, May 2021, 9 pp.
Khazaee et al., "Fault Detection of Engine Timing Belt Based on Vibration Signals using Data-Mining Techniques and a Novel Data Fusion Procedure," Structural Health Monitoring, vol. 15, No. 5, Jun. 2016, pp. 583-598.
Kyrtatos et al., "Cycle-to-Cycle Variations in Diesel Engines," Applied Energy, vol. 171, Jun. 2016, pp. 120-132.
Li et al., "A New Swarm Intelligence Optimized Multiclass Multi-Kernel Relevant Vector Machine: An Experimental Analysis in Failure Diagnostics of Diesel Engines," Structural Health Monitoring, vol. 17, No. 6, Dec. 2017, 1503-1519.
Liu et al., "A Method of Acoustic Emission Source Location for Engine Fault Based on Time Difference Matrix," Structural Health Monitoring, vol. 22, No. 1, May 24, 2022, pp. 621-638.
Liu et al., "A Novel Adaptive Fault Diagnosis Algorithm for Multi-Machine Equipment: Application in Bearing and Diesel Engine," Structural Health Monitoring, vol. 22, No. 3, Aug. 4, 2022, pp. 1677-1707.
Ofner et al., "In-Cylinder Pressure Reconstruction from Engine Block Vibrations via a Branched Convolutional Neural Network," Mechanical Systems and Signal Processing, vol. 183, No. 7, Jan. 2023, 10 pp.
Sharma et al., "Misfire Detection in an IC Engine Using Vibration Signal and Decision Tree Algorithms," Measurement, vol. 50, Apr. 2014, pp. 370-380.
Shirazi et al., "Application of Discrete Wavelet Transform (DWT) in Combustion Failure Detection of IC Engines," 2007 5th International Symposium on Image and Signal Processing and Analysis, Sep. 27-29, 2007, pp. 482-486.
Syta et al., "Detection of Cylinder Misfire in an Aircraft Engine Using Linear and Non-Linear Signal Analysis," Measurement, vol. 174, No. 108982, Jan. 2021, 10 pp.
Taghizadeh-Alisaraei et al., "Characterization of Engine's Combustion-Vibration Using Diesel and Biodiesel Fuel Blends by Time-Frequency Methods: A Case Study," Renewable Energy, vol. 95, Apr. 2016, pp. 422-432.
Vong et al., "Engine ignition signal diagnosis with Wavelet Packet Transform and Multi-class Least Squares Support Vector Machines," Expert Systems with Applications, vol. 38, No. 7, Jul. 2011, pp. 8563-8570.
Vulli et al., "Time-Frequency Analysis of Single-Point Engine-Block Vibration Measurements for Multiple Excitation-Event Identification," Journal of Sound and Vibration, vol. 321, No. 3-5, Apr. 2009, pp. 1129-1143.
Wu et al., "Continuous Wavelet Transform Technique for Fault Signal Diagnosis of Internal Combustion Engines," NDT & E International, vol. 39, No. 4, Jun. 2006, pp. 304-311.
Wu et al., "Investigation of Engine Fault Diagnosis Using Discrete Wavelet Transform and Neural Network," Expert Systems with Applications, vol. 35, No. 3, Oct. 2008, pp. 1200-1213.
Yang et al., "Fault Detection in a Diesel Engine by Analysing the Instantaneous Angular Speed," Mechanical Systems and Signal Processing, vol. 15, No. 3, May 2001, pp. 549-564.
Abbaszadehmosayebi et al., "Determination of Specific Heat Ratio and Error Analysis for Engine Heat Release Calculations," Applied Energy, vol. 122, Jun. 1, 2014, pp. 143-150.
Amezcua et al., "Accelerometer-Based Estimation of Combustion Features for Engine Feedback Control of Compression-Ignition Direct-Injection Engines," SAE Technical Paper, Apr. 2020, 9 pp.
Ayati et al., "Classification-Based Fuel Injection Fault Detection of a Trainset Diesel Engine Using Vibration Signature Analysis," Journal of Dynamic Systems Measurement and Control, Feb. 2020, 12 pp.
Baghban et al., "Improved Estimation of Cetane Number of Fatty Acid Methyl Esters (FAMEs) Based Biodiesels Using TLBO-NN and PSO-NN Models," Fuel, vol. 232, Nov. 2018, pp. 620-631.
Bemani et al., "Modeling of Cetane Number of Biodiesel from Fatty Acid Methyl Ester (FAME) Information Using GA-, PSO-, and HGAPSO-LSSVM Models," Renewable Energy, vol. 150, May 2020, pp. 924-934.
Bizon et al., "Reconstruction of In-Cylinder Pressure in a Diesel Engine from Vibration Signal Using a RBF Neural Network Model," SAE Technical Paper, Sep. 11, 2011, 12 pp.
Brunt et al., "Calculation of Heat Release in Direct Injection Diesel Engines," AE Technical Paper 1999-01-0187, International Congress and Exposition, Mar. 1-4, 1999, 17 pp.
Businaro et al., "Accelerometer Based Methodology for Combustion Parameters Estimation," Energy Procedia, vol. 81, Dec. 2015, pp. 950-959.
Chiatti et al., "Accelerometer Measurement for MFB Evaluation in Multi-Cylinder Diesel Engine," Energy, vol. 133, Aug. 15, 2017, pp. 843-850.

(56) References Cited

OTHER PUBLICATIONS

Chiavola et al., "Combustion Characterization in Diesel Engine via Block Vibration Analysis," SAE Technical Paper, Apr. 12, 2010, 9 pp.

Cressie, "The Origins of Kriging," Mathematical Geology, vol. 22, No. 3, Apr. 1990, pp. 239-252.

Di Pasquale et al., "FEREBUS: Highly Parallelized Engine for Kriging Training," Journal of Computational Chemistry, vol. 37, No. 29, Nov. 2016, pp. 2606-2616.

Du et al., "Reconstructing Cylinder Pressure from Vibration Signals Based on Radial Basis Function Networks," Proceedings of the Institution of Mechanical Engineers, Part D: Journal of Automobile Engineering, vol. 215, No. 6, Jun. 2001, pp. 761-767.

Gao et al., "Reconstruction of Diesel Engine Cylinder Pressure Using a Time Domain Smoothing Technique," Mechanical Systems and Signal Processing, vol. 13, No. 5, Sep. 1999, pp. 709-722.

Giakoumis et al., "Estimation of Biodiesel Cetane No. Density, Kinematic Viscosity and Heating Values from its Fatty Acid Weight Composition," Fuel, vol. 222, Jun. 2018, pp. 574-585.

Gill et al., "A Study of Small HSDI Diesel Engine Fuel Injection Equipment Faults using Acoustic Emission," Journal of Acoustic Emission (Journal-AE), vol. 18, Mar. 2014, 6 pp.

Han et al., "Recursive Engine In-Cylinder Pressure Estimation Using Kalman Filter and Structural Vibration Signal," IFAC PapersOnLine, vol. 51, No. 31, 2018, (Applicant points out, in accordance with MPEP 609.04(a), that the year of publication, 2018, is sufficiently earlier than the effective U.S. filing date, so that the particular month of publication is not in issue.) pp. 700-705.

Jeon et al., "Accelerometer-Based Robust Estimation of In-Cylinder Pressure for Cycle-to-Cycle Combustion Control," IEEE Transactions on Instrumentation and Measurement, vol. 72, Aug. 2023, 13 pp.

Jia et al., "Review of Sensing Methodologies for Estimation of Combustion Metrics," Journal of Combustion, vol. 2016, No. 3, Jan. 2016, 9 pp.

Jianmin et al., "Fuel Injection System Fault Diagnosis Based on Cylinder Head Vibration Signal," Procedia Engineering, vol. 16, Dec. 2011, pp. 218-223.

Johnsson et al., "Cylinder Pressure Reconstruction Based on Complex Radial Basis Function Networks from Vibration and Speed Signals," Mechanical Systems and Signal Processing, vol. 20, No. 8, Nov. 2006, pp. 1923-1940.

Jones et al., Efficient Global Optimization of Expensive Black-Box Functions, Journal of Global optimization, vol. 13, No. 4, pp., Dec. 1998, pp. 455-492.

Jung et al., "Closed-Loop Control for Diesel Combustion Noise Using Engine Vibration Signals," SAE Technical Paper, Jun. 15, 2015, 7 pp.

Kobori et al., "A Study of Ignition Delay of Diesel Fuel Sprays," International Journal of Engine Research, vol. 1, No. 1, Feb. 2000, pp. 29-39.

Lee et al., "Reduction of Engine Emissions via a Real-Time Engine Combustion Control with an EGR Rate Estimation Model," International Journal of Automotive Technology, vol. 18, No. 4, Aug. 2017, pp. 571-578.

Leonhardt et al., "Methods for Engine Supervision and Control based on Cylinder Pressure Information," IEEE/ASME Transactions on Mechatronics, vol. 4, No. 3, Sep. 1999, 15 pp.

Lin et al., "Condition Monitoring and Diagnosis of Injector Faults in a Diesel Engine Using In-Cylinder Pressure and Acoustic Emission Techniques," Conference: the 14th Asia Pacific Vibration Conference, Dec. 2011, 10 pp.

Liu et al., "A Fourier Analysis Based Synthetic Method for In-cylinder Pressure Estimation," SAE Technical Paper, Powertrain & Fluid Systems Conference & Exhibition, Oct. 16-19, 2006, 10 pp.

Mcgann et al., "Effect of the Cetane Number on Jet Fuel Spray Ignition at High-Temperature and -Pressure Conditions," Energy Fuels, vol. 34, Jan. 10, 2020, pp. 1337-1346.

Min et al., "Autoignition of Varied Cetane Number Fuels at Low Temperatures," Proceedings of the Combustion Institute, vol. 37, No. 4, Jun. 2018, pp. 5003-5011.

Moro et al., "In-Cylinder Pressure Reconstruction Based on Instantaneous Engine Speed Signal," Journal of Engineering for Gas Turbines and Power, vol. 124, No. 1, Jan. 2002, pp. 220-225.

Murphy et al., "Effects of Cetane Number on Jet Fuel Combustion in a Heavy-Duty Compression Ignition Engine at High Load," SAE Technical Paper, Apr. 12, 2011, 14 pp.

Nelder et al., "A Simplex Method for Function Minimization," The Computer Journal, vol. 7, No. 4, Jan. 1965, pp. 308-313.

Olsson et al., "The Nelder-Mead Simplex Procedure for Function Minimization," Technometrics, vol. 17, No. 1, Feb. 1975, pp. 45-51.

Pal et al., "Constrained Surrogate-Based Engine Calibration Using Lower Confidence Bound," IEEE/ASME Transactions on Mechatronics, vol. 26, No. 6, Dec. 2021, pp. 3116-3127.

Panzani et al., "Engine Knock Margin Estimation Using In-Cylinder Pressure Measurements," IEEE/ASME Transactions on Mechatronics, vol. 22, No. 1, Feb. 2017, 11 pp.

Payri et al., "Digital Signal Processing of In-Cylinder Pressure for Combustion Diagnosis of Internal Combustion Engines," Mechanical Systems and Signal Processing, vol. 24, No. 6, Aug. 2010, pp. 1767-1784.

Pla et al., "Adaptive In-Cylinder Pressure Model for Spark Ignition Engine Control," Fuel, vol. 299, Sep. 1, 2021, 8 pp.

Polonowski et al., "Accelerometer Based Sensing of Combustion in a High Speed HPCR Diesel Engine," SAE Transactions, vol. 116, 2007 World Congress, Apr. 16-19, 2007, 18 pp.

Ponti et al., "Remote Combustion Sensing Methodology for Non-Intrusive Cylinder Pressure Estimation in Diesel Engines," 7th IFAC Symposium on Advances in Automotive Control The International Federation of Automatic Control Sep. 4-7, 2013, pp. 353-359.

Randall et al., "Diesel Engine Cylinder Pressure Reconstruction," Proceedings of 21st International Seminar of Modal Analysis Noise and Vibration Engineering, vol. 2, Sep. 18-20, 1996, pp. 847-856.

Saldana et al., "Flash Point and Cetane Number Predictions for Fuel Compounds Using Quantitative Structure Property Relationship (QSPR) Methods," Energy & Fuels, vol. 25, No. 9, Sep. 2011, pp. 3900-3908.

Schten et al., "Design of an Automotive Grade Controller for In-Cylinder Pressure Based Engine Control Development," SAE Technical Paper, 2007 World Congress, Apr. 16-19, 2007, 11 pp.

Sen et al., "Analysis of Cycle-to-Cycle Pressure Oscillations in a Diesel Engine," Mechanical Systems and Signal Processing, vol. 22, Feb. 2008, pp. 362-373.

Shahid et al., "Real-Time Abnormality Detection and Classification in Diesel Engine Operations with Convolutional Neural Network," Expert Systems with Applications, vol. 192, Apr. 15, 2022, 11 pp.

Wang et al., "A New Method of Estimating Derived Cetane Number for Hydrocarbon Fuels, " Fuel, vol. 241, Apr. 2019, pp. 319-326.

Zabihi-Hesari et al., "Fault Detection and Diagnosis of a 12-Cylinder Trainset Diesel Engine Based on Vibration Signature Analysis and Neural Network," Journal of Mechanical Engineering Science, Jun. 2018, 14 pp.

U.S. Appl. No. 18/465,387, filed Sep. 12, 2023, by Rajamani et al.

\* cited by examiner

SYSTEM AND METHOD FOR CONTROLLING A COMPRESSION IGNITION ENGINE

This application claims the benefit of U.S. Provisional Application Ser. No. 63/364,675 entitled "SYSTEM AND METHOD FOR CONTROLLING A COMPRESSION IGNITION ENGINE" and filed May 13, 2022, the entire contents of which are incorporated herein by reference.

GOVERNMENT INTEREST

This invention was made with government support under W911NF-20-2-0161 awarded by the Army/ARO. The government has certain rights in the invention.

TECHNICAL FIELD

This disclosure generally relates to compression ignition engines and, in particular, to control systems for compression ignition engines.

BACKGROUND

Cetane number (CN) is an important property of fuels for compression ignition (CI) engines, such as diesel fuel or jet fuel. Cetane number is an indication of the ignitability of diesel fuels; it provides information about the speed of self-ignition in a fuel when injected into hot air of a CI engine through a fuel injector. For compression ignition engines running, for instance, on jet fuel, the cetane number of the fuel may vary while the engine is running, and the engine controller needs the CN information to adjust control inputs accordingly to maintain robust and efficient engine operation. In addition, the cetane number of a fuel may not be known when the fuel is placed in the fuel tank of a CI engine but is an important parameter to know when generating engine control inputs for the CI engine as a function of the current fuel mix.

SUMMARY

In general, the present disclosure describes techniques for controlling a CI engine based on an estimate of the CN of the fuel being used for the CI engine. The CN is a parameter used to generate the appropriate engine control inputs for a CI engine, for example, a CI engine running on jet fuel. However, the CN of the fuel may vary while the engine is running. The present technique provides a CN estimate of the current fuel in real-time. That estimation may then be used by an engine controller to adjust control inputs to maintain robust and efficient engine operation according to any variations to the CN of the fuel during engine running.

In one example approach, the system determines the cetane number of the current fuel in real-time during operation of the CI engine. The example technique described herein determines an online estimation of the cetane number based on the engine model and on real-time combustion heat release analysis results. In one example approach, the optimization-based technique estimates the fuel cetane number based on the CA50 received from the real-time heat release analysis and on a model of the CI engine. In one such example approach, the CI engine model is an engine Kriging model prediction. In one example approach, the system generates an estimate of the cetane number, provides this information to the controller and generates appropriate control inputs for the next cycle, all within one engine cycle.

In one example approach, the model-based cetane number estimation system uses an optimization algorithm to provide cetane number estimation. The CN estimation system may be implemented in real-time computing hardware, providing a fast and accurate method for online cetane number estimation.

In one example, a method of estimating a cetane number of a fuel includes: receiving, by processing circuitry, current engine operating condition measurements from a compression ignition (CI) engine using the fuel; determining, by the processing circuitry, a value for a current engine performance indicator; determining, by the processing circuitry, a projected engine performance indicator value for the CI engine based on a current estimated cetane number, current engine control signals and the current engine operating condition measurements; determining, by the processing circuitry, that a difference between the value of the current engine performance indicator and the projected engine performance indicator value is greater than a threshold amount; and responsive to determining that the difference between the value of the current engine performance indicator and the projected engine performance indicator value is greater than the threshold amount, determining, by the processing circuitry, a new estimated cetane number.

In another example, a CI engine system includes: a CI engine configured to receive engine control signals and to generate current engine operating condition measurements, the CI engine operating on a current fuel; an engine controller connected to the CI engine, wherein the engine controller comprises processing circuitry configured to: receive the current engine operating condition measurements from the CI engine; determine a value for a current engine performance indicator; determine a projected engine performance indicator value for the CI engine based on a current estimated cetane number, current engine control signals and the current engine operating condition measurements; determine that a difference between the value of the current engine performance indicator and the projected engine performance indicator value is greater than a threshold amount; and responsive to determining that the difference between the value of the current engine performance indicator and the projected engine performance indicator value is greater than the threshold amount, determine a new estimated cetane number.

In another example, A non-transitory computer-readable medium comprising instructions that, when executed, cause processing circuitry of a computing device to: receive current engine operating condition measurements from a compression ignition (CI) engine using a fuel; determine a value for a current engine performance indicator; determine a projected engine performance indicator value for the CI engine based on a current estimated cetane number, current engine control signals and the current engine operating condition measurements; determine that a difference between the value of the current engine performance indicator and the projected engine performance indicator value is greater than a threshold amount; and responsive to determining that the difference between the value of the current engine performance indicator and the projected engine performance indicator value is greater than the threshold amount, determine a new estimated cetane number.

Details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

The CN of a fuel provides information about the speed of self-ignition of that fuel when injected into hot gas in a CI engine through a fuel injector. The CI engine controller uses the CN information to adjust control inputs to maintain robust and efficient engine operation. The cetane number of a fuel being injected into the CI engine may not be known, however, when new fuel is placed in the fuel tank of a CI engine, when fuel tanks are switched out or when new fuel from the fuel tank is mixing with existing fuel in the fuel injection system such as the common rail. If the actual CN varies substantially from the expected CN used to adjust control inputs, engine performance suffers.

In operation, the CN number of the fuel may vary in real-time. Previous approaches for estimating the CN of a fuel fall into one of two categories: 1) offline CN estimation and 2) real-time CN estimation. Offline CN estimation cannot, however, be adapted to the real-time computation environment of CI engine operation.

Previous attempts at real-time CN estimation have required specific engine limitations, such as limiting CN estimation to a predetermined engine operating condition such as engine start, or engine fuel cutoff. In addition, real-time CN estimation techniques to date require specific procedures, such as a series of retarded fuel injection events, that are not part of the normal engine operation. Neither offline CN estimation nor existing real-time CN estimation may be used effectively to address changes in fuel CN in real-time when engine operation cannot be interrupted.

The technique described herein provides an online (e.g., real-time) estimation of the cetane number based on a model of the CI engine and on one or more real-time engine parameters that can be used to adjust operation of the CI engine. In one example approach, for instance, the optimization-based CN estimation algorithm described herein estimates the fuel cetane number based on real-time heat release analysis (e.g., the crank angle at which 50% of the heat from combustion has been released (CA50)) and engine model prediction.

The model of the CI engine may be built to generate an engine performance indicator (e.g., CA50) given an estimated CN, engine control signals, and engine operating condition measurements.

In some examples, the technique includes receiving current engine operating condition measurements (e.g., speed, load, manifold pressure, manifold temperature) and a current engine performance indicator value (e.g., CA50) from the CI engine. The technique may further include determining a projected engine performance indicator value for the CI engine based on the model of the CI engine (including a current estimated CN), and determining whether a difference between the current engine performance indicator value and the projected engine performance indicator value is greater than a threshold amount. In response to the difference exceeding the threshold amount, the technique may include determining a new estimated CN. In some examples, the technique may include determining the new estimated CN by iteratively generating projected engine performance indicator values based on new estimated CNs until the difference between the current engine performance indicator value and the projected engine performance indicator value is below a threshold amount.

In some example approaches, the engine model is a Kriging model. In operation, the technique generates an estimate of the cetane number for the current fuel mix and provides the estimate of the cetane number to the engine controller, all within less than one engine cycle. The engine controller then generates appropriate control inputs for the CI engine for use in the next engine cycle based on the new estimated CN.

Figure 1:
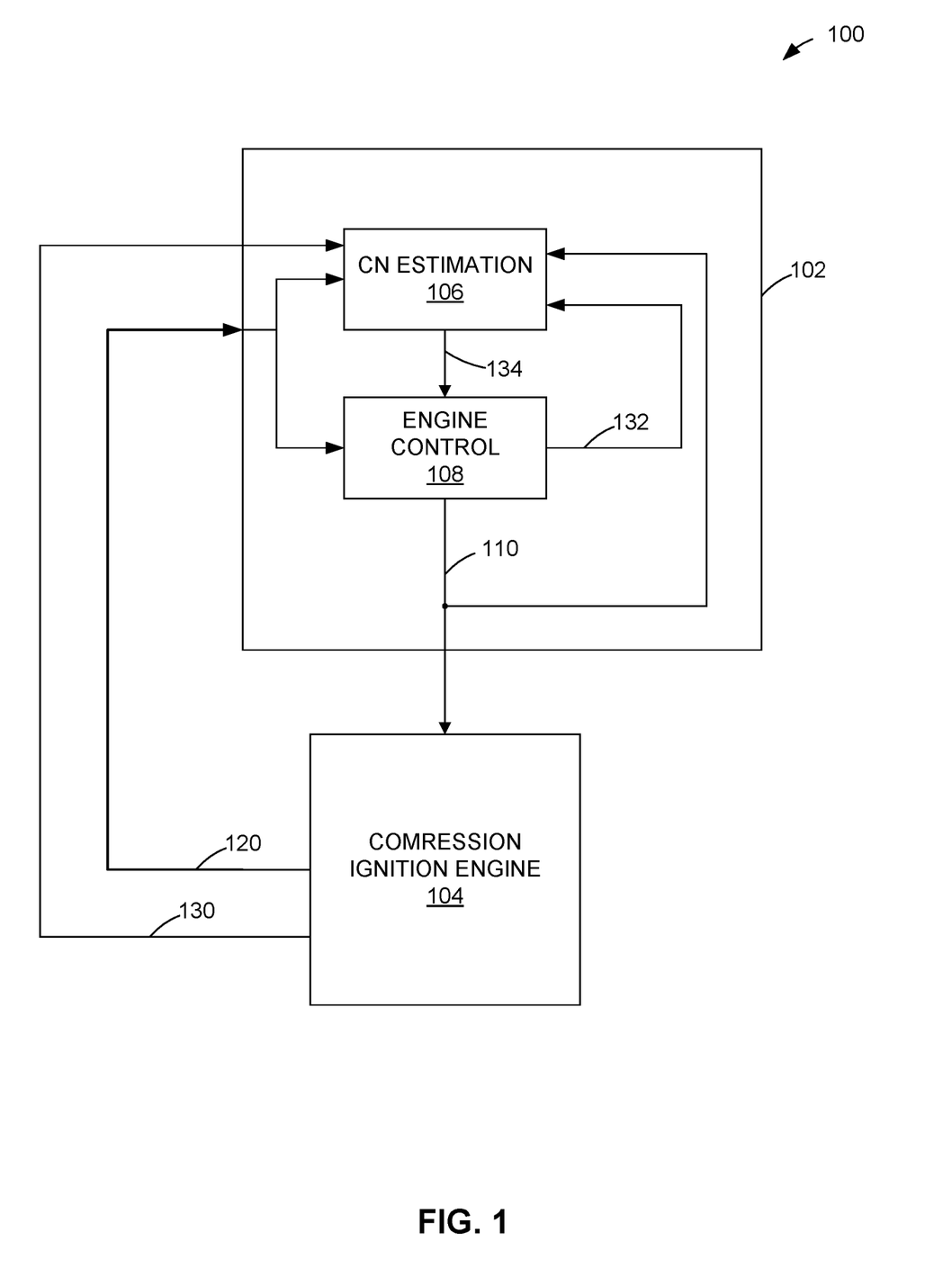
FIG. 1 is a block diagram illustrating an example CI engine system, in accordance with one or more techniques of this disclosure.

FIG. 1 is a block diagram illustrating example CI engine system 100, in accordance with one or more techniques of this disclosure. In the example shown in FIG. 1, example CI engine system 100 includes CI engine controller 102 and CI engine 104. Controller 102 includes CN estimation 106 and engine control 108. Engine control 108 uses the CN information generated by CN estimation 106 to adjust control inputs to maintain robust and efficient engine operation. CI engine controller 102 may be electrically connected to CI engine 104 so that digital data may be sent between CI engine controller 102 and CI engine 104.

CI engine controller 102 and CI engine 104 may each include one or more processors that may be or be part of processing circuitry. The one or more processors may include fixed function circuitry and/or programmable processing circuitry. The one or more processors may include any one or more of a microprocessor, a controller, a digital signal processor (DSP), an application specific integrated circuit (ASIC), a field-programmable gate array (FPGA), or equivalent discrete or analog logic circuitry. In some examples, the one or more processors may include multiple components, such as any combination of one or more microprocessors, one or more controllers, one or more DSPs, one or more ASICs, or one or more FPGAs, as well as other discrete or integrated logic circuitry. The functions attributed to the one or more processors herein may be embodied as software, firmware, hardware or any combination thereof. Functions attributed to CI engine controller 102 and CI engine 104 herein may be attributable to the one or more processors of CI engine controller 102 and/or CI engine 104.

CN estimation 106 may be a program stored in memory of CI engine controller 102 and configured to execute on the one or more processors of CI engine controller 102. Similarly, engine control 108 may be a program stored in memory of CI engine controller 102 and configured to execute on the one or more processors of CI engine controller 102.

CI engine 104, operating on a fuel with a CN, may receive engine control signals 110 from engine control 108 of CI engine controller 102. CI engine 104 may operate according to engine control signals 110 to power a vehicle and generate engine operating condition measurements 120. Although engine control signals 110 are depicted as sent to both CN estimation 106 and CI engine 104, in some examples, CN estimation 106 may receive engine control inputs indicative of engine control signals 110, rather than the identical engine control signals 110 that engine control 108 sends to CI engine 104. For example, as described in more detail with respect to FIG. 3 below, engine control 108 may generate one or more engine control inputs that CN engine 106 receives directly, while one or more other algorithms of engine controller 102 and/or engine control 108 may further augment the engine control inputs before sending them to CI engine 104.

CI engine 104 may include one or more sensors that measure operating characteristics of CI engine 104. CI engine 104 may send operating condition measurements 120 to CI engine controller 102. In some examples, operating condition measurements 120 represent engine sensor readings indicative of the operating characteristics. For example, operating condition measurements 120 may include sensor signal data and/or values indicative of the operating characteristics. For example, operating condition measurements 120 may include a manifold pressure value and/or signal data from a manifold pressure sensor. In some examples, sensor readings 120 may include a manifold temperature value and/or signal data from a manifold temperature sensor.

CI engine controller 102 may receive engine performance indicator 130 as well as operating condition measurements 120 from CI engine 104. For example, CI engine controller 102 may receive real-time heat release analysis (e.g., the crank angle at which 50% of the heat from combustion has been released (CA50)) as engine performance indicator 130. CN estimation 106 may use the CA50 and an engine model prediction to estimate the CN of the current fuel mix used by CI engine 104. Other measures of engine performance (such as based on the pressure signal or accelerometer) may be used as engine performance indicator 130. For instance, the accelerometer signal can provide an indication for combustion timing and effectiveness.

CN estimation 106 may use engine performance indicator 130 of CI engine 104 as an indicator of engine performance and employ a data-driven surrogate model developed for CI engine 104. Based on engine testing results and offline heat release analysis, current engine performance indicators such as start of combustion (SOC), timing of the half mass fraction burned (CA50), and indicated mean effective pressure (IMEP) may be treated as model output, and surrogate models may be trained based on these input-output data sets taken at sweeping model inputs, including the fuel cetane number, current engine operating condition measurements 120 (e.g., speed, load, manifold pressure, manifold temperature), and current engine control signals 110 (e.g., injection timing, injection duration, injection pressure, glow plug power).

The one or more processors of CI engine controller 102 may be configured to receive current engine operating condition measurements 120 from CI engine 104 and determine a value for a current engine performance indicator 130.

In some examples, CI engine 104 may measure or determine engine performance indicator 130 and send it to CI engine controller 102, as mentioned above. CI engine controller 102 may determine the current engine performance indicator 130 by receiving it from CI engine 104. CI engine controller 102 may then determine a projected engine performance indicator value 132 for CI engine 104 based on a current estimated CN 134, current control signals, and the current engine operating condition measurements.

After determining a projected engine performance indicator value, CI engine controller 102 may determine if a difference between the value of the current engine performance indicator 130 and the projected engine performance indicator value is greater than a threshold amount. If the determine difference is greater than the threshold amount, CI engine controller 102 may determine a new estimated CN 134.

Figure 2:
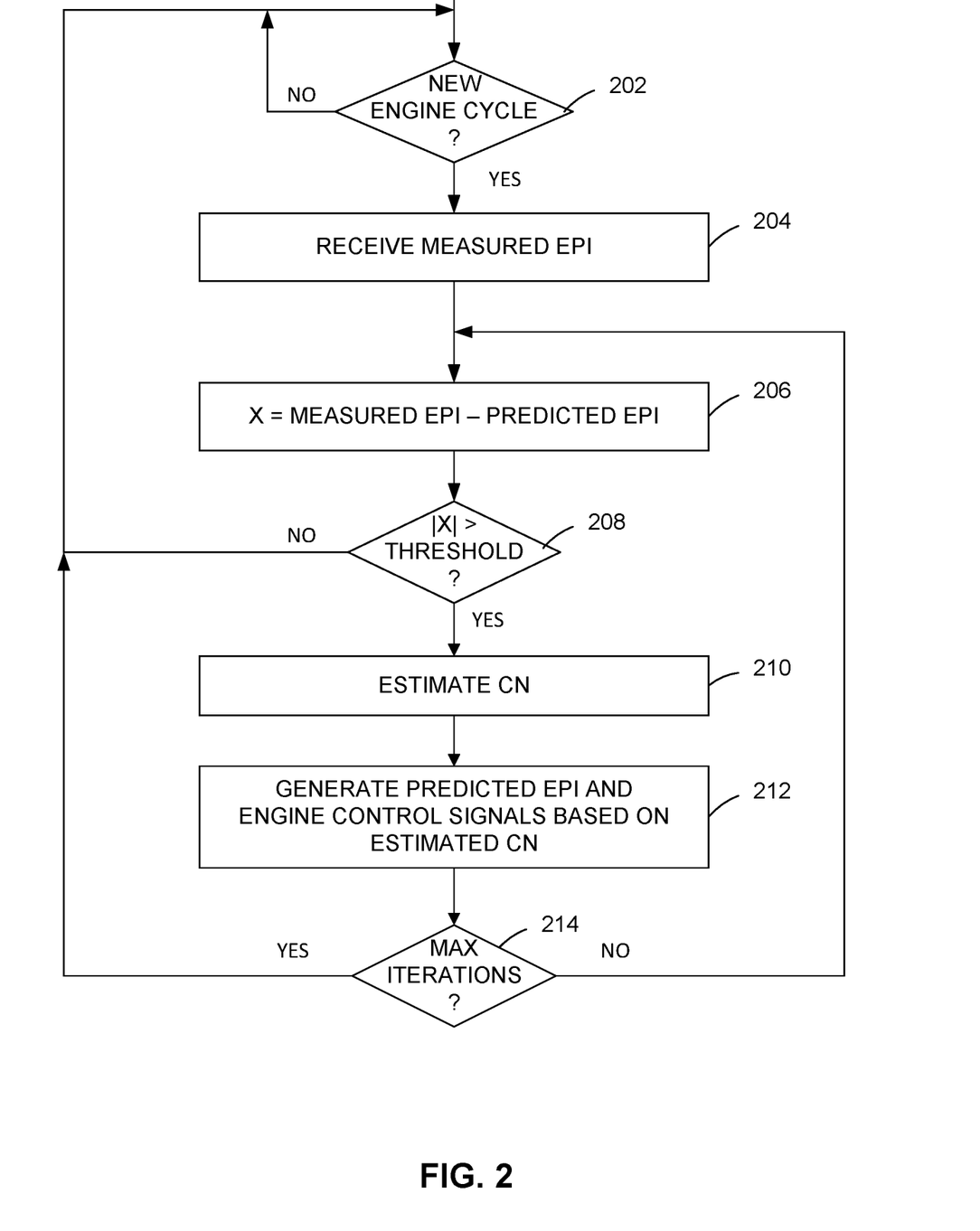
FIG. 2 is a flowchart illustrating engine control based on CN estimation, in accordance with one or more techniques of this disclosure.

FIG. 2 is a flowchart illustrating an example engine control based on CN estimation, in accordance with one or more techniques of this disclosure. The engine control illustrated in FIG. 2 may be performed by CN estimation 106 of FIG. 1. In the example shown in FIG. 2, CN estimation 106 remains at 202 until a new engine cycle is detected, then moves to 204. At 204, CN estimation 106 stores the latest measured engine performance indicator (EPI) value, for example CA50, received from CI engine 108. CN estimation 106 then calculates a difference between measured and predicted EPI value (206). The predicted EPI value may be stored in memory from a previous iteration, received by CN estimation 106 (e.g., from engine control 108 of FIG. 1), or determined by CN estimation 106. A check is made at 208 to determine if the difference is greater than a threshold amount and, if not, CN estimation 106 moves back to 202, and waits for a new engine cycle.

If, however, the check made at 208 determines that the difference is greater than the threshold amount, CN estimation 106 calculates a new CN estimate (210) and engine control 108 generates a new predicted EPI based on the new CN estimate (212). A check is made at 214 to determine if the maximum number of iterations have occurred and, if so, CN estimation 106 moves back to 202, and waits for a new engine cycle. Otherwise, CN estimation 106 moves to 206, and calculates a difference between measured and predicted CA50.

Figure 3:
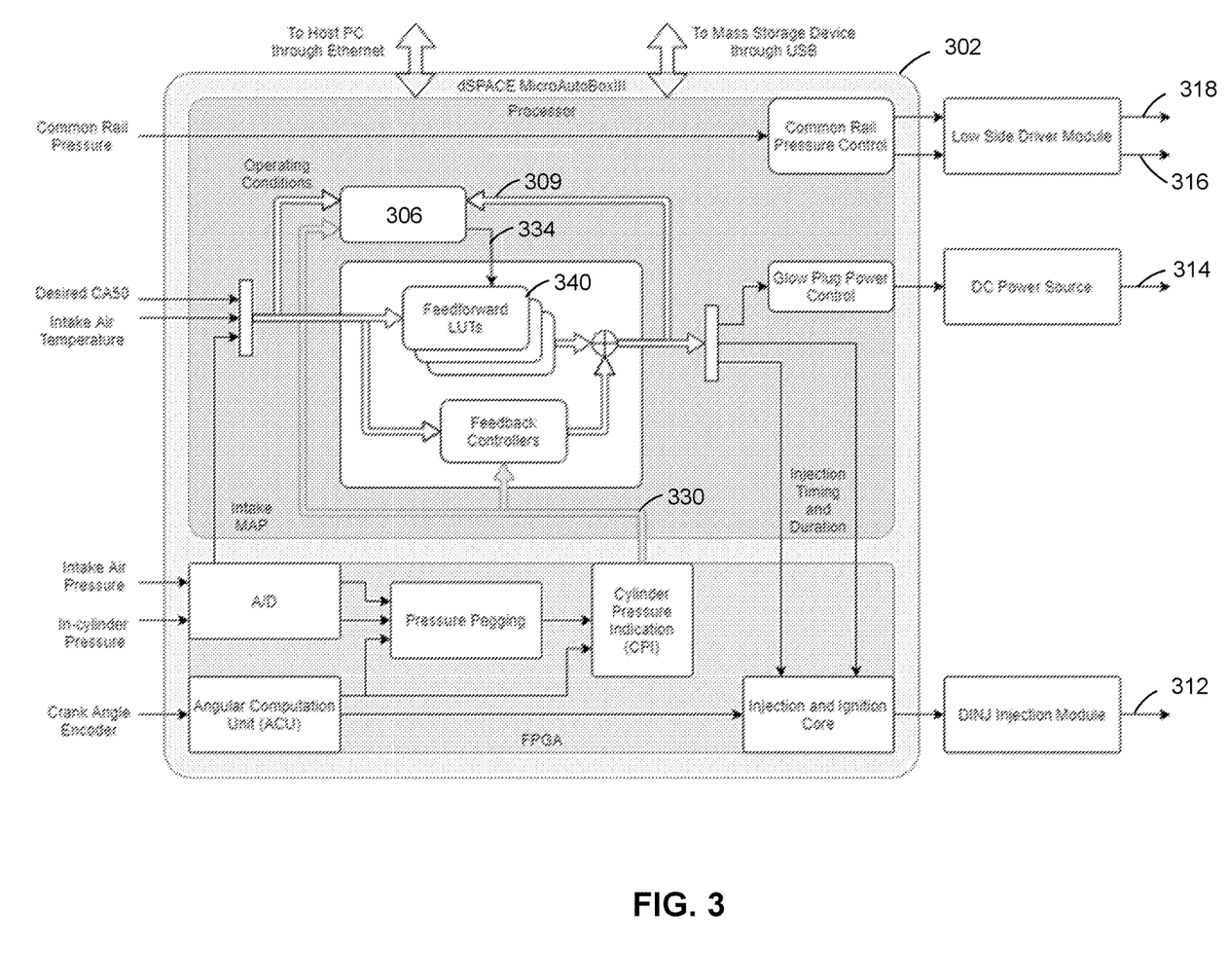
FIG. 3 is a block diagram showing a more detailed example engine controller, in accordance with one or more techniques of this disclosure.

FIG. 3 is a block diagram showing a more detailed example engine controller 302, in accordance with one or more techniques of this disclosure. In some examples, engine controller 302 may be substantially the same as CI engine controller 102 of FIG. 1. Although shown as separate from engine controller 302, in some examples, low side driver module, DC power source, and DINJ injection module may be implemented as functions of engine controller 302. In some examples, low side driver module, DC power source, and DINJ injection module may be implemented by one or more processors of a CI engine in communication with engine controller 302. Although not depicted in FIG. 3, in some examples all the algorithms of engine controller 302 that are not CN estimation 306 may make up an engine control program (e.g., engine control 108 of FIG. 1). For example, the algorithms that determine current EPI 330 may be a part of the engine control program of engine controller 302.

In the example shown in FIG. 3, engine controller 302 uses feedforward LUTs 340 to generate input 309 for CN estimation 306. Input 309 may include the predicted EPI (e.g., predicted CA50) and one or more engine control inputs as a function of estimated CN 334. In the example of FIG.

3, input 309 includes engine control inputs indicative of engine control signals, including glow plug signal 114 and injector signal 112. The engine control input indicative of injector signal 112 may include information on fuel injection timing and duration. In some examples, input to CN estimation 306 may include any combination of one or more engine control inputs and/or signals. For example, input to CN estimation 306 may also include inlet metering valve signal 316 and/or high-pressure valve signal 318.

Figure 4:
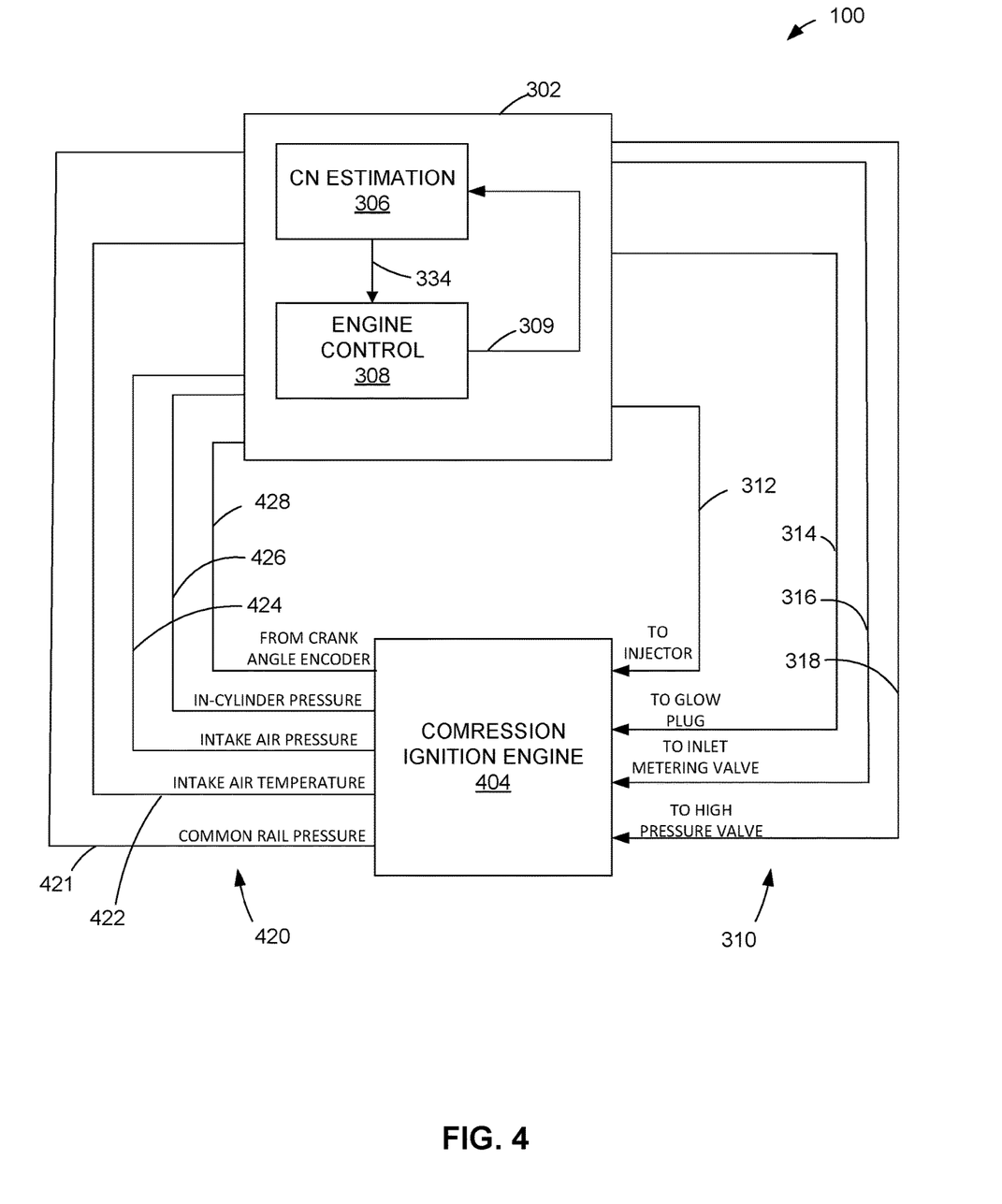
FIG. 4 is a block diagram illustrating the example engine controller of FIG. 3 in communication with an example CI engine, in accordance with one or more techniques of this disclosure.

FIG. 4 is a block diagram illustrating the example engine controller 302 of FIG. 3 in communication with example CI engine 404, in accordance with one or more techniques of this disclosure. CI engine 404 may be substantially the same as CI engine 104 of FIG. 1. Engine control 308 may generate a predicted EPI (e.g., predicted CA50) and engine control signals 310 as a function of the estimated CN. In the example of FIG. 4, engine control signals 310 include injector signal 312, glow plug signal 314, inlet metering valve signal 316 and high-pressure valve signal 318. CI engine 404 may generate operating condition measurements 420 during operation in response to engine control signals 310, and may return operating condition measurements 420 to engine controller 302. CI engine 404 may send operating condition measurements 420 such as common rail pressure 421, intake air temperature 422, intake air pressure 424, in-cylinder pressure 426 and crank angle 428 to engine controller 302 for estimation of a new CN. In some examples, engine controller 302 may determine the current EPI for CI engine 404. In some examples, engine controller 302 may receive a current EPI from CI engine 404.

Engine controller 302 may receive operating condition measurements 420 from CI engine 404, determine a value for a current measured EPI, and estimate the CN number of the fuel used in CI engine 404 based on operating condition measurements 420 and the current measured EPI value. CN estimation 306 and engine control 308 may receive operating condition measurements 420 and the current measured EPI value, and iteratively determine a new estimated CN. For example, engine control 308 may determine a predicted EPI value based on operating condition measurements 420, the current measured EPI value, and estimated CN 334 received from CN estimation 306. In some examples, for the initial engine cycle, estimated CN 334 may be an initial CN stored in memory. CN estimation 306 may receive input 309 from engine control 308 including the predicted EPI value and engine control inputs and/or engine control signals. CN estimation 306 may determine if a difference between the current EPI value and the projected EPI value is greater than a threshold amount. If the difference is greater than the threshold amount, CN estimation 306 may determine a new estimated CN 334.

In one example approach, CN estimation 306 employs a model-based cetane number estimation technique that uses an optimization algorithm executing on real-time computing hardware during normal engine operation, providing a fast and accurate CN estimation. Engine controller 302 may use an input-output model of CI engine 404 that captures combustion and heat release timing such as CA50 and uses optimization/root-finding techniques in CN estimation 306 to search for the cetane number that provides the appropriate heat release timing for the given engine operating condition. Engine controller 302 generates the estimate of the cetane number within one engine cycle and uses this information to generate appropriate control inputs for the next cycle. One advantage of the CN estimation and control technique is that an estimate of the CN may be obtained in real-time during normal engine operation without any interruption. Another advantage of the CN estimation and control technique is that a more accurate estimate of the CN can be obtained by using the model-based optimization.

In one example approach, surrogate modelling is used to model CI engine 404. There are a number of different methods for building surrogate models based on input-output training data, such as polynomial regression, radial basis function (RBF) modeling, and Kriging. Polynomial regression model is one of the most widely used surrogate model due to its simplicity. The model prediction can be written into a summation of weighted polynomials as $$\hat{f}(x)=\Sigma_{i=0}^{m} w_i x^i,$$

in which m is the highest order of the polynomials, x is the predictor input, and the weight $w_i$ can be obtained using the least square solution from the training data set as $w=[w_1 \ w_2 \ \ldots \ w_m]^T=(\Phi^T\Phi)^{-1}\Phi^T y$, where $y=[y^{(1)} \ y^{(2)} \ \ldots \ y^{(n)}]^T \in \mathbb{R}^n$ is a vector of model outputs from all n training data, and $\Phi$ is given by the Vandermonde matrix:

$$\Phi = \begin{bmatrix} 1 & x_1 & x_1^2 & \ldots & x_1^m \\ 1 & x_2 & x_2^2 & \ldots & x_2^m \\ \vdots & \vdots & \vdots & \vdots & \vdots \\ 1 & x_n & x_n^2 & \ldots & x_n^m \end{bmatrix}$$

Although polynomial models are typically used for approximating single variable functions, there is research for adapting this method onto multi-variable function approximation. However, the parameter estimation for multi-variable functions is much more complicated than the single variable case. In addition, the order of polynomials is difficult to determine for modeling complicated systems such as internal combustion engines, and an improper selection of the polynomial order could lead to an under-fitting or over-fitting model.

Another commonly used surrogate is the radial basis function models, where the model prediction can be regarded as a summation of weighted radial functions:

$$\hat{f}(x)=w^T\psi=\Sigma_{i=0}^{n} w_i \Psi(\|x-c^{(i)}\|)$$

where n is the number of radial functions, $\Psi$ is a radial function with output value only depending on the Euclidean distance between the input vector x and the center $c^{(i)}$ of the basis function. This predictor can be regarded as a single layer neural network (NN), with RBF chosen as the activation function.

One typical way for building the RBF model is to choose the center of RBFs at the exact coordinates of the training data inputs, i.e., $c^{(i)}=x^{(i)}, \forall i=1, \ldots, n$, then the output weight vector $w=\psi^{-1}y$ can be calculated by solving the inverse of the Gram matrix $\psi \in \mathbb{R}^{n \times n}$, where the $(i, j)^{th}$ element is defined using the following radial basis function:

$$\psi_{i,j}=\Psi(\|x^{(i)}-x^{(j)}\|).$$

Compared to the polynomial regression model (1), the RBF model predictor (2) replace the polynomial basis functions with radial basis functions (e.g., Gaussian functions, inverted quadratic functions), giving RBF regression models a natural advantage over traditional polynomial models on handling multi-variable function approximations.

By using the following basis function, Kriging model provides additional flexibility by adding input weights $\theta$ to all k nodes at the input layer of the radial basis function neural network (RBFNN)

$$\Psi^{(i)}=\exp(-\Sigma_{l=1}^{k}\theta_l|x_l-x_l^{(i)}|^{p_l}).$$

In the following part, we demonstrate the Kriging modeling for the CA50 using Gaussian function $\Psi^{(i)}=\exp[-d^2(x, x^{(i)})]$ with the weighted distance d defined as follows:

$$d(u, v) = \sqrt{\sum_{l=1}^{k}\left[\frac{(u_l - v_l)}{\zeta_l}\right]^2}, \zeta_l > 0, \forall l = 1, \ldots, k,$$

where $x^{(i)} \in \mathbb{R}^k$ is the $i^{th}$ input of the n training data set, containing all k model input variables (CN, operating condition, control inputs). Hyper parameters (length scales) $\zeta_l$, l=1, ..., k are tuned by optimization algorithms to maximize the concentrated ln-likelihood function:

$$\ln(L) = -\frac{n}{2}\ln(\hat{\sigma}^2) - \frac{1}{2}\ln(\Psi), \text{ where}$$

$$\hat{\sigma}^2 = \frac{(y - 1\mu)^T \Psi^{-1}(y - 1\mu)}{n}$$

is the estimation of the variance with $1=[1\ 1\ \ldots\ 1]^T \Sigma \mathbb{R}^n$ and $y=[y^{(1)}\ y^{(2)}\ \ldots\ y^{(n)}]^T \in \mathbb{R}^n$, $\psi \in \mathbb{R}^{n \times n}$ is the correlation matrix, with the element (i, j) being the correlation function $\psi_{i,j}=\exp[-d^2(x^{(i)}, x^{(j)})]$ between two input vectors $x^{(i)}$ and $x^{(j)}$. This specific Kriging model is also known as the Gaussian process regression.

After the training completes, the CA50 prediction by the Gaussian process regression model can be presented as a function of the cetane number (CN), operating condition (OP), and control inputs (IN) as follows, $$CA50 = \hat{f}(CN, OP, IN) = \hat{\mu} + \psi^T w, \text{ where } \hat{\mu} = \frac{1^T \Psi^{-1} y}{1^T \Psi^{-1} 1},$$

and the weight vector of the Gaussian functions is given by $w=\psi^{-1}(y-1\hat{\mu})$.

Engine control 308 may use the built surrogate model to determine projected EPI values for CI engine 404, where the surrogate model uses current estimated CN 334, the current engine control signals, and one or more of current engine operating condition measurements 420 as input.

CN estimation will be discussed next. After obtaining the surrogate model that can be computed in real-time, the challenge now is to develop a model-based searching algorithm to provide CN estimation for the next engine cycle. This can be considered as either a single variable optimization or a root-finding problem at a certain operating condition and control inputs with a given function output (e.g., CA50 prediction from the surrogate model).

For utilizing optimization methods, in one example approach, the CN estimation problem may be regarded as an optimization problem by finding the minimum of the error function $$e=|CA50_{act}-\hat{f}(CN, OP, IN)|$$

between the $CA50_{act}$ that is computed from in-cylinder pressure signals in real time and the Kriging model prediction.

Figure 5:
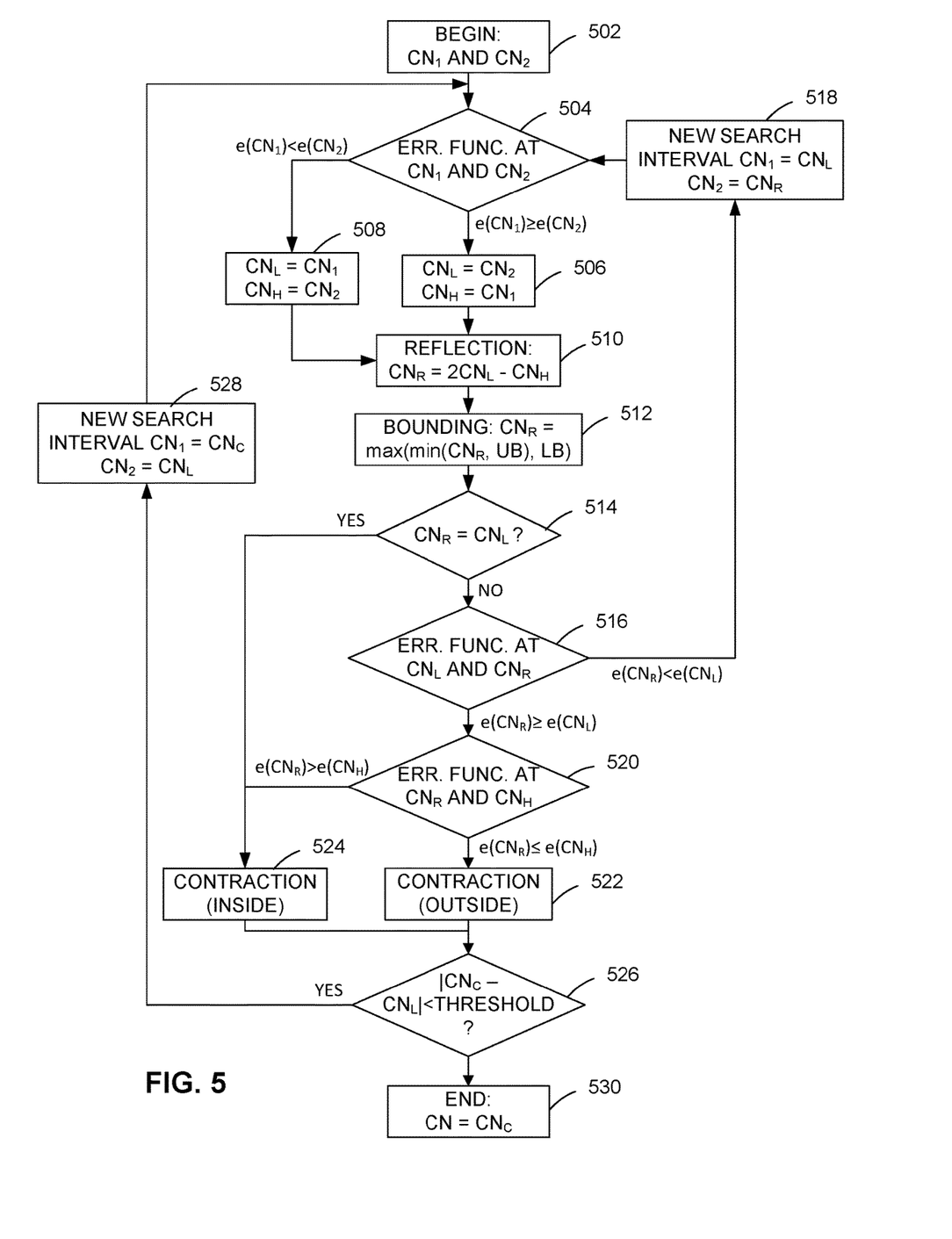
FIG. 5 is a flowchart of an optimization algorithm for CN estimation, in accordance with one or more techniques of this disclosure.

FIG. 5 is a flowchart of an example optimization algorithm for CN estimation, in accordance with one or more techniques of this disclosure. One of the most popular methods for optimization algorithm is the Nelder-Mead simplex method, utilizing a series of operations including reflection, expansion, and contraction. The flowchart will be described with reference to CA50 as the EPI, however it is understood that other EPI may be used. For single variable minimization problem, the algorithm begins with two initial points: one point ($CN_1$) as the initial CN estimation, and another point ($CN_2$) chosen using the following strategy (502).

Use the lower bound of the searching range ($CN_2$=LB), if the measured $CA50_{act}$ is larger than the model predicted one.

Use the upper bound of the searching range ($CN_2$=UB), if the measured $CA50_{act}$ is smaller than the model predicted one.

The CN estimation process using Nelder-Mead method may be seen in the flow chart shown in FIG. 5. According to the Nelder-Mead method, an error function may determine the absolute difference between the measured CA50 and predicted CA50 using a surrogate model (e.g., a kriging model) for both $CN_1$ and $CN_2$ as chosen above (504). The error function may determine a first absolute difference ($e_1$) between the measured CA50 and predicted CA50 using the surrogate model with $CN_1$ as shown in the following equation:

$$e_1=|CA50_{act}-\hat{f}(CN_1, OP, IN)|$$

where $\hat{f}$ is a kriging model function that determines a predicted EPI (e.g., CA50) using CN, OP, and IN as inputs. Wherein CN=cetane number, OP=operating condition measurements, and IN=control inputs from an engine controller for controlling a CI engine. Similarly, the error function may determine a second absolute difference ($e_2$) between the measured CA50 and predicted CA50 using the surrogate model with $CN_2$ as shown in the following equation $$e_2=|CA50_{act}-\hat{f}(CN_2, OP, IN)|.$$

If $e_1$ is greater than or equal to $e_2$, the method moves on to 506 where $CN_L$ is assigned the value of $CN_2$ and $CN_H$ is assigned the value of $CN_1$ (506). However, if $e_1$ is less than $e_2$, the method moves to 508 where $CN_L$ is assigned the value of $CN_1$ and $CN_H$ is assigned the value of $CN_2$ (508). After the values for $CN_L$ and $CN_H$ have been assigned, the method performs a reflection step, where it determines a value $CN_R$ based on the following equation (510):

$$CN_R=2CN_L-CN_H.$$

After determining a value for $CN_R$, the method performs a bounding step that assigns a new value to $CN_R$ based on the following equation (512):

$$CN_R=\max(\min(CN_R, UB), LB).$$

That is, if $CN_R$ as calculated in 510 is a value between the upper bound and lower bound, then the value of $CN_R$ remains as calculated in 510. However, if $CN_R$ as calculated in 510 is not between the upper bound and lower bound, $CN_R$ is reassigned a value equal to the bound that is numerically closer.

The method then performs a check to see if $CN_R$ is equal to $CN_L$ (514). If $CN_R$ is equal to $CN_L$, the method performs an inside contraction step, where the method defines a $CN_C$ as follows (524):

$$CN_C=(CN_L+CN_H)/2.$$

If $CN_R$ is not equal to $CN_L$, the method performs another error function comparison as above with reference to 504, but using $CN_R$ and $CN_L$, rather than $CN_1$ and $CN_2$ (516). The method determines a third and fourth absolute difference as shown in the following equations:

$$e_3 = |CA50_{act} - \hat{f}(CN_R, OP, IN)|;$$

$$e_4 = |CA50_{act} - \hat{f}(CN_L, OP, IN)|.$$

If $e_3$ is less than $e_4$, the method starts a new search interval where the method assigns $CN_1$ the value of $CN_L$ and $CN_2$ the value of $CN_R$ (518). After assigning new values to $CN_1$ and $CN_2$ at 518, the method returns to 504. If $e_3$ is greater than or equal to $e_4$, the method performs another error function comparison as above with reference to 504 and 516, this time using $CN_R$ and $CN_H$ (520). The method determines a fifth absolute difference as shown in the following equation:

$$e_5 = |CA50_{act} - \hat{f}(CN_H, OP, IN)|.$$

If $e_3$ is greater than $e_5$, the method performs an inside contraction at 524 as described above. If $e_3$ is less than or equal to es, the method performs an inside contraction step (522). At 522, the method defines $CN_C$ as follows (524):

$$CN_C = (CN_L + CN_R)/2.$$

After defining $CN_C$ at either 524 or 522, the method determines if the absolute difference between $CN_C$ and $CN_L$ is lower than a threshold (526). If $|CN_C - CN_L|$ is not lower than the threshold, the method starts a new search interval where the method assigns $CN_1$ the value of $CN_C$ and $CN_2$ the value of $CN_L$ (528). If $|CN_C - CN_L|$ is lower than the threshold, the method assigns the value of $CN_C$ as the new estimated CN and ends (530).

Figure 6:
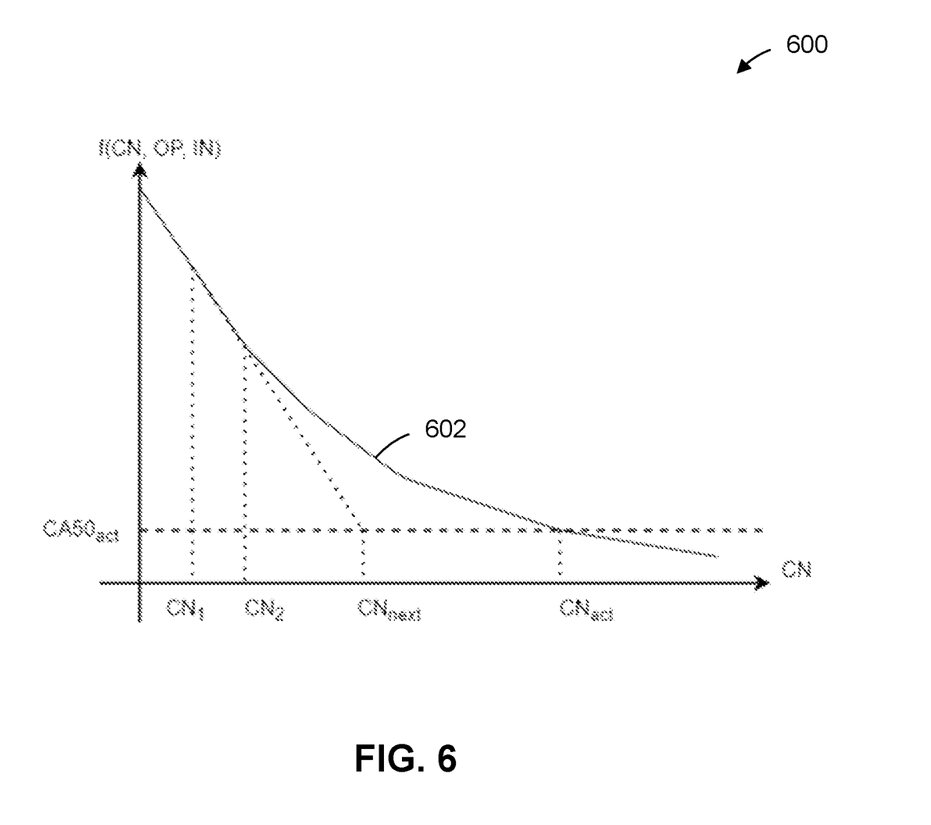
FIG. 6 is an illustration of another optimization algorithm for CN estimation, in accordance with one or more techniques of this disclosure.

FIG. 6 is an illustration of another example optimization algorithm for CN estimation, in accordance with one or more techniques of this disclosure. CN estimation 106 may form the problem into a root-finding problem of the equation:

$$\hat{f}(CN, OP, IN) = CA50_{act}$$

Secant method is a fast root-finding method similar to the gradient-based Newton's method, using the slope of secant line 602 instead of the function gradient calculation to find a new function root for each iteration based on the current result:

$$CN_{new} = CN_{current} + (CA50_{act} - \hat{f}(C_{current}, OP, IN))/k,$$

where $k = \hat{f}(CN_2, OP, IN) - \hat{f}(CN_1, OP, IN)/(CN_2 - CN_1)$ is the slope of the secant line 602 calculated near the current CN estimation, as is shown in FIG. 6. Assuming that the initial CN estimation is inside the local neighborhood of the actual CN where $\hat{f}(CN, OP, IN)$ is monotonous, then the estimated CN will converge to the actual one within several iterations. To prevent the CN estimation from getting out of the 'local' range, the calculated slope k is limited to $|k| > 0.5$.

Figure 7A:
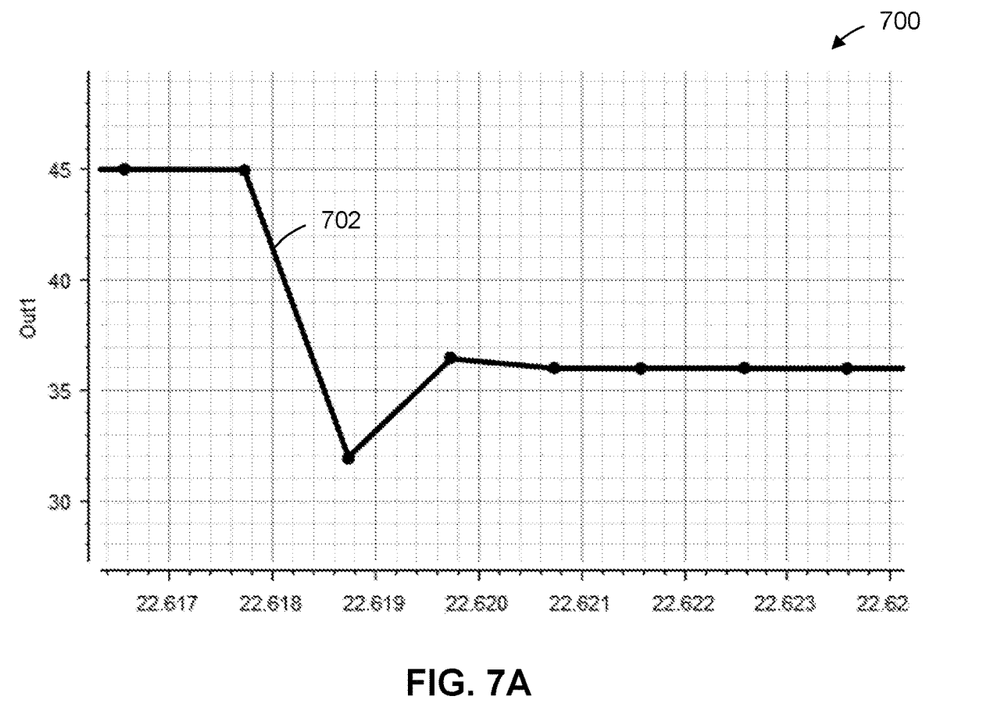
FIGS. 7A and 7B illustrate a real-time simulation of CN estimation, in accordance with one or more techniques of this disclosure.
Figure 7B:
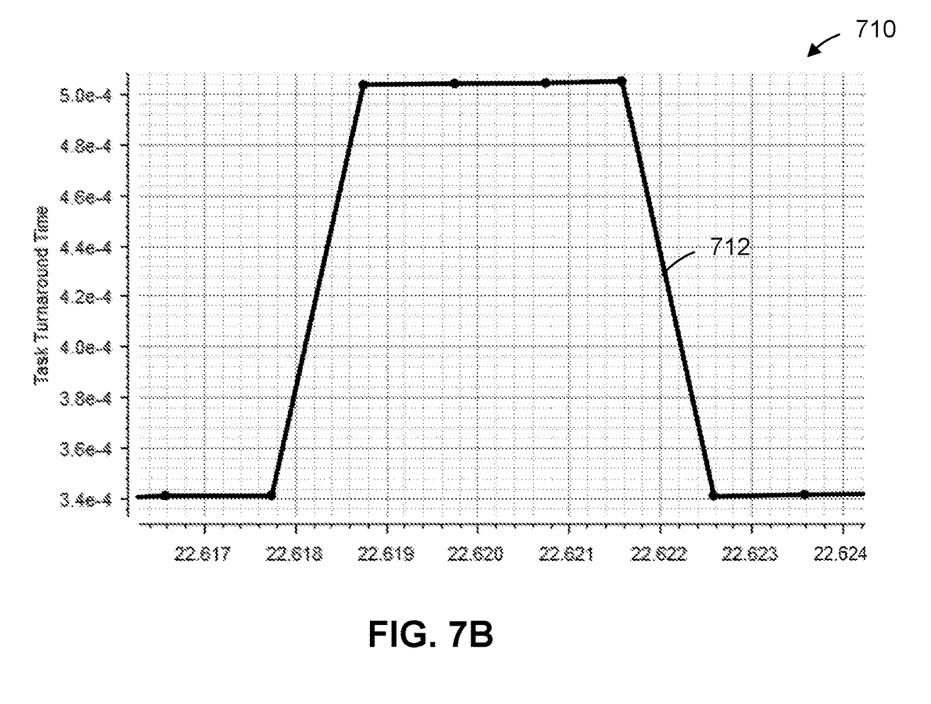

In one example approach, to save computational resources, the model-based CN estimation algorithm is implemented as a triggered subsystem on the real-time controller. Once the CA50 is reported after the combustion completes for each engine cycle, the program checks the difference between actual and predicted CA50 and triggers the CN estimation algorithm if the difference is larger than a preset threshold (e.g., 1-degree crank angle). After each iteration of estimation, the new estimated CN is updated to the memory for generating control inputs through feedforward look-up tables (LUTs). The algorithm will keep searching for CN until the difference between the actual and model predicted CA50 is lower than a threshold (e.g., 0.1-degree crank angle) or the maximum number of iterations has reached. FIGS. 7A and 7B show that the CN estimation algorithm is implemented on the processor side of the MicroAutoBoxIII control hardware, receiving data from operating conditions, control inputs, and heat release analysis results, and providing the estimated CN to the feedforward controller. Other controller hardware may be used as well.

FIGS. 7A and 7B illustrate an example real-time simulation of CN estimation, in accordance with one or more techniques of this disclosure. In one example approach, a simulation was performed on the dSPACE MicroAutoBox-III. The simulation shows the effectiveness of the proposed CN estimating method, with the running time for each processor cycle set to 1 ms. The actual CN was set to 36, and the initial estimated CN was set to 45. As is shown in chart 700 in FIG. 7A, the estimated CN 702 converges to the actual one within 4 iterations, providing the accurate CN estimation within 72 crank angle degrees when the engine is running at 3000 RPM. As is shown in chart 710 in FIG. 7B, the total running time 712 for each iteration of CN estimation is around 0.5 ms from when the algorithm was triggered.

This disclosure includes various examples, such as the following examples.

Example 1: A method of estimating a cetane number of a fuel, including: receiving current engine operating condition measurements from a compression ignition (CI) engine using the fuel; determining a value for a current engine performance indicator; determining a projected engine performance indicator value for the CI engine based on a current estimated cetane number, current engine control signals and the current engine operating condition measurements; determining that a difference between the value of the current engine performance indicator and the projected engine performance indicator value is greater than a threshold amount; and responsive to determining that the difference between the value of the current engine performance indicator and the projected engine performance indicator value is greater than the threshold amount, determining a new estimated cetane number.

Example 2: The method of example 1, wherein determining the projected engine performance indicator value for the CI engine includes applying a surrogate model of the CI engine to the current estimated cetane number, the current engine control signals and the current engine operating condition measurements.

Example 3: The method of example 2, wherein the surrogate model is based on a polynomial regression of values of the current engine performance indicator for values of the current cetane number, the current engine control signals and the current engine operating condition measurements.

Example 4: The method of example 2, wherein the surrogate model is based on a radial basis function (RBF) modeling of values of the current engine performance indicator for values of the current cetane number, the current engine control signals and the current engine operating condition measurements.

Example 5: The method of example 2, wherein the surrogate model is based on a Kriging modeling of values of the current engine performance indicator for values of the current cetane number, the current engine control signals and the current engine operating condition measurements.

Example 6: The method of any of examples 1-5, wherein determining the new estimated cetane number includes performing an optimization of an error function between the current engine performance indicator value and a Kriging model prediction of engine performance indicator values.

Example 7: The method of example 6, wherein performing an optimization includes applying a Nelder-Mead simplex method.

Example 8: The method of example 6, wherein performing an optimization includes applying a secant method.

Example 9: The method of any of examples 1-8, wherein the engine performance indicator is CA50.

Example 10: The method of any of examples 1-9, wherein the engine performance indicator is SOC.

Example 11: The method of any of examples 1-10, wherein the engine performance indicator is IMEP.

Example 12: The method of any of examples 1-11, where the threshold is a function of the current engine operating condition measurements and the estimated cetane number.

Example 13: The method of any of examples 1-12, wherein the current engine performance indicator value is determined based on in-cylinder pressure signals received from the CI engine.

Example 14: The method of any of examples 1-13, wherein the current engine performance indicator value is determined based on accelerometer signals from the CI engine.

Example 15: The method of any of examples 1-14, further including controlling, based on the new estimated cetane number, the CI engine.

Example 16: A CI engine system, including: a CI engine configured to receive engine control signals and to generate current engine operating condition measurements, the CI engine operating on a current fuel; an engine controller connected to the CI engine, wherein the engine controller includes processing circuitry configured to: receive the current engine operating condition measurements from the CI engine; determine a value for a current engine performance indicator; determine a projected engine performance indicator value for the CI engine based on a current estimated cetane number, current engine control signals and the current engine operating condition measurements; determine that a difference between the value of the current engine performance indicator and the projected engine performance indicator value is greater than a threshold amount; and responsive to determining that the difference between the value of the current engine performance indicator and the projected engine performance indicator value is greater than the threshold amount, determine a new estimated cetane number.

Example 17: The CI engine system of example 16, wherein the processing circuitry is further configured to generate new engine control signals based on the new estimated cetane number and transmit the new engine control signals to the CI engine to control the CI engine.

Example 18: The CI engine system of any of examples 16-17, wherein to determine the projected engine performance indicator value for the CI engine the processing circuitry is further configured to applying a surrogate model of the CI engine to the current estimated cetane number, the current engine control signals and the current engine operating condition measurements.

Example 19: The CI engine system of any of examples 16-18, wherein to determine the new estimated cetane number the processing circuitry is further configured to perform an optimization of an error function between the current engine performance indicator value and a surrogate model prediction of engine performance indicator values.

Example 20: A non-transitory computer-readable medium including instructions that, when executed, cause processing circuitry of a computing device to: receive current engine operating condition measurements from a compression ignition (CI) engine using a fuel; determine a value for a current engine performance indicator; determine a projected engine performance indicator value for the CI engine based on a current estimated cetane number, current engine control signals and the current engine operating condition measurements; determine that a difference between the value of the current engine performance indicator and the projected engine performance indicator value is greater than a threshold amount; and responsive to determining that the difference between the value of the current engine performance indicator and the projected engine performance indicator value is greater than the threshold amount, determine a new estimated cetane number.

Example 21: A non-transitory, computer-readable medium comprising executable instructions, which when executed by processing circuitry, cause a computing device to perform the method of any of examples 1-15.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a cassette, magnetic media, optical media, or other computer readable media.

Various aspects of the disclosure have been described. These and other aspects are within the scope of the following claims.

What is claimed is:

1. A method of estimating a cetane number of a fuel, comprising:
   receiving, by processing circuitry, current engine operating condition measurements from a compression ignition (CI) engine using the fuel;
   determining, by the processing circuitry, a value for a current engine performance indicator;
   determining, by the processing circuitry, a projected engine performance indicator value for the CI engine based on a current estimated cetane number, current engine control signals and the current engine operating condition measurements;
   determining, by the processing circuitry, that a difference between the value of the current engine performance indicator and the projected engine performance indicator value is greater than a threshold amount;
   responsive to determining that the difference between the value of the current engine performance indicator and the projected engine performance indicator value is greater than the threshold amount, determining, by the processing circuitry, a new estimated cetane number, and
   controlling, based on the new estimated cetane number, the CI engine.

2. The method of claim 1, wherein determining the projected engine performance indicator value for the CI engine includes applying a surrogate model of the CI engine to the current estimated cetane number, the current engine control signals and the current engine operating condition measurements.

3. The method of claim 2, wherein the surrogate model is based on a polynomial regression of values of the current engine performance indicator for values of the current cetane number, the current engine control signals and the current engine operating condition measurements.

4. The method of claim 2, wherein the surrogate model is based on a radial basis function (RBF) modeling of values of the current engine performance indicator for values of the current cetane number, the current engine control signals and the current engine operating condition measurements.

5. The method of claim 2, wherein the surrogate model is based on a Kriging modeling of values of the current engine performance indicator for values of the current cetane number, the current engine control signals and the current engine operating condition measurements.

6. The method of claim 1, wherein determining the new estimated cetane number includes performing an optimization of an error function between the current engine performance indicator value and a Kriging model prediction of engine performance indicator values.

7. The method of claim 6, wherein performing an optimization includes applying a Nelder-Mead simplex method.

8. The method of claim 6, wherein performing an optimization includes applying a secant method.

9. The method of claim 1, wherein the engine performance indicator is CA50.

10. The method of claim 1, wherein the engine performance indicator is SOC.

11. The method of claim 1, wherein the engine performance indicator is IMEP.

12. The method of claim 1, where the threshold is a function of the current engine operating condition measurements and the estimated cetane number.

13. The method of claim 1, wherein the current engine performance indicator value is determined based on in-cylinder pressure signals received from the CI engine.

14. The method of claim 1, wherein the current engine performance indicator value is determined based on accelerometer signals from the CI engine.

15. The method of claim 1, further comprising controlling, based on the new estimated cetane number, the CI engine.

16. A CI engine system, comprising:
   a CI engine configured to receive engine control signals and to generate current engine operating condition measurements, the CI engine operating on a current fuel;
   an engine controller connected to the CI engine, wherein the engine controller comprises processing circuitry configured to:
   receive the current engine operating condition measurements from the CI engine;
   determine a value for a current engine performance indicator;
   determine a projected engine performance indicator value for the CI engine based on a current estimated cetane number, current engine control signals and the current engine operating condition measurements;
   determine that a difference between the value of the current engine performance indicator and the projected engine performance indicator value is greater than a threshold amount;
   responsive to determining that the difference between the value of the current engine performance indicator and the projected engine performance indicator value is greater than the threshold amount, determine a new estimated cetane number, and
   control, based on the new estimated cetane number, the CI engine.

17. The CI engine system of claim 16, wherein the processing circuitry is further configured to generate new engine control signals based on the new estimated cetane number and transmit the new engine control signals to the CI engine to control the CI engine.

18. The CI engine system of claim 16, wherein to determine the projected engine performance indicator value for the CI engine the processing circuitry is further configured to applying a surrogate model of the CI engine to the current estimated cetane number, the current engine control signals and the current engine operating condition measurements.

19. The CI engine system of claim 16, wherein to determine the new estimated cetane number the processing circuitry is further configured to perform an optimization of an error function between the current engine performance indicator value and a surrogate model prediction of engine performance indicator values.

20. A non-transitory computer-readable medium comprising instructions that, when executed, cause processing circuitry of a computing device to:
   receive current engine operating condition measurements from a compression ignition (CI) engine using a fuel;
   determine a value for a current engine performance indicator;
   determine a projected engine performance indicator value for the CI engine based on a current estimated cetane number, current engine control signals and the current engine operating condition measurements;
   determine that a difference between the value of the current engine performance indicator and the projected engine performance indicator value is greater than a threshold amount;
   responsive to determining that the difference between the value of the current engine performance indicator and the projected engine performance indicator value is greater than the threshold amount, determine a new estimated cetane number, and
control, based on the new estimated cetane number, the CI engine.

\* \* \* \* \*